(12) United States Patent
Wu

(10) Patent No.: US 12,545,359 B2
(45) Date of Patent: Feb. 10, 2026

(54) BICYCLE PEDAL

(71) Applicant: Chang-Hsin Wu, Chiayi County (TW)

(72) Inventor: Chang-Hsin Wu, Chiayi County (TW)

( * ) Notice: Subject to any disclaimer, the term of this patent is extended or adjusted under 35 U.S.C. 154(b) by 0 days.

(21) Appl. No.: 18/931,336

(22) Filed: Oct. 30, 2024

(65) Prior Publication Data

US 2025/0171106 A1  May 29, 2025

(30) Foreign Application Priority Data

Nov. 24, 2023 (TW) ................. 112145457

(51) Int. Cl.
*B62M 3/08* (2006.01)
*B62J 45/40* (2020.01)
*B62J 45/41* (2020.01)
*B62J 45/421* (2020.01)

(52) U.S. Cl.
CPC ................ *B62M 3/08* (2013.01); *B62J 45/41* (2020.02); *B62J 45/421* (2020.02)

(58) Field of Classification Search
CPC ... B62M 3/08; B62M 3/16; B62J 45/41; B62J 45/411; B62J 45/421
See application file for complete search history.

(56) References Cited

U.S. PATENT DOCUMENTS

| | | | | |
|---|---|---|---|---|
| 8,844,404 B2 * | 9/2014 | Chen | ...................... | B62J 45/421 74/594.4 |
| 9,150,279 B2 | 10/2015 | Gros et al. | | |
| 9,481,428 B2 * | 11/2016 | Gros | ...................... | B62J 45/415 |
| 9,969,451 B2 * | 5/2018 | Sasaki | ...................... | B62M 3/086 |
| 12,358,590 B2 * | 7/2025 | Wu | .......................... | B62M 3/08 |
| 2014/0251079 A1 | 9/2014 | Chen et al. | | |
| 2015/0158549 A1 | 6/2015 | Gros et al. | | |

FOREIGN PATENT DOCUMENTS

| | | | | |
|---|---|---|---|---|
| CN | 201189940 Y | 2/2009 | | |
| CN | 203937811 U | 11/2014 | | |
| CN | 207173874 U | 4/2018 | | |
| CN | 207683706 U | 8/2018 | | |
| CN | 212149159 U | 12/2020 | | |
| CN | 218536978 U | 2/2023 | | |
| EP | 1362552 A1 * | 11/2003 | ............... | G01L 3/24 |
| EP | 3733493 A1 | 11/2020 | | |
| IT | RM20100588 A1 | 5/2012 | | |
| TW | 201812266 A | 4/2018 | | |

* cited by examiner

*Primary Examiner* — Adam D Rogers
(74) *Attorney, Agent, or Firm* — Li & Cai Intellectual Property (USA) Office

(57) ABSTRACT

A bicycle pedal includes a pedal body, a force-bearing detector, and a cover plate. The pedal body has an accommodation space that is recessed. The force-bearing detector includes a bridging frame, a force-bearing beam arm, and a force sensor. A periphery of the bridging frame is fixed in the accommodation space. One end of the force-bearing beam arm is connected to the bridging frame. The force sensor is disposed on a bottom surface of the force-bearing beam arm. The cover plate is movably disposed in the accommodation space. A bottom of the cover plate is fixedly connected to a top surface of the force-bearing beam arm.

10 Claims, 12 Drawing Sheets

BICYCLE PEDAL

CROSS-REFERENCE TO RELATED PATENT APPLICATION

This application claims the benefit of priority to Taiwan Patent Application No. 112145457, filed on Nov. 24, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a bicycle pedal, and more particularly to a pedal that can be installed on an electric-assisted bicycle and has a force detection mechanism to detect the force exerted by the feet of the rider and transmit the detection to a control module of the electric-assisted bicycle to provide auxiliary riding power in real-time.

BACKGROUND OF THE DISCLOSURE

Electrically assisted bicycles are bicycles that use human power as the main power and electricity as the auxiliary power. In order to understand the needs of the rider and provide auxiliary power, sensors are needed as a medium for communicating information between the rider and the bicycle. The purpose of the sensor is to "figure out the true movement status of the rider" and send the information to a control module, thereby allowing a motor to provide an appropriate assistance power at the moment.

The sensors of existing electric-assisted bicycles can be divided into two types, one type includes speed sensors and the other type includes torque sensors. A disadvantage of the speed sensors is that the difference in pedaling force caused by changes in slope is difficult to be determined. The torque sensor senses the torque generated by the pedaling of the rider, that is, the torque sensor detects the force of the pedal and provides appropriate assistance power.

However, existing torque sensors are usually located on a wheel axle or a mid-mounted motor, and are still unable to sense the force exerted by the foot of the rider on the pedal in a more real-time manner.

Therefore, how to improve the structural design so that the electric-assisted bicycle can more accurately detect the actual pedaling force of the rider and provide appropriate assistance in real-time has become an issue to be addressed in the relevant.

SUMMARY OF THE DISCLOSURE

In response to the above-referenced technical inadequacies, the present disclosure provides a bicycle pedal to accurately provide a more realistic and real-time detection of paddling and force exertion of a rider.

In order to solve the above-mentioned problems, one of the technical aspects adopted by the present disclosure is to provide a bicycle pedal. The bicycle pedal includes a pedal body, a force-bearing detector, and a cover plate. The pedal body has an accommodation space that is recessed. The force-bearing detector includes a bridging frame, a force-bearing beam arm, and a force sensor. A periphery of the bridging frame is fixed in the accommodation space. One end of the force-bearing beam arm is connected to the bridging frame. The force sensor is disposed on a bottom surface of the force-bearing beam arm. The cover plate is movably disposed in the accommodation space. A bottom of the cover plate is fixedly connected to a top surface of the force-bearing beam arm.

Therefore, in the bicycle pedal provided by the present disclosure, by virtue of "the bicycle pedal including a pedal body, a force-bearing detector, and a cover plate; the force-bearing detector including a bridging frame, a force-bearing beam arm, and a force sensor; one end of the force-bearing beam arm being connected to the bridging frame; the force sensor being disposed on a bottom surface of the force-bearing beam arm; the cover plate being movably disposed in the accommodation space; and a bottom of the cover plate being fixedly connected to a top surface of the force-bearing beam arm," the bicycle pedal is able to more accurately detect an actual peddling and force exertion of the rider, transmit information to a control module, and provide suitable auxiliary power through a motor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
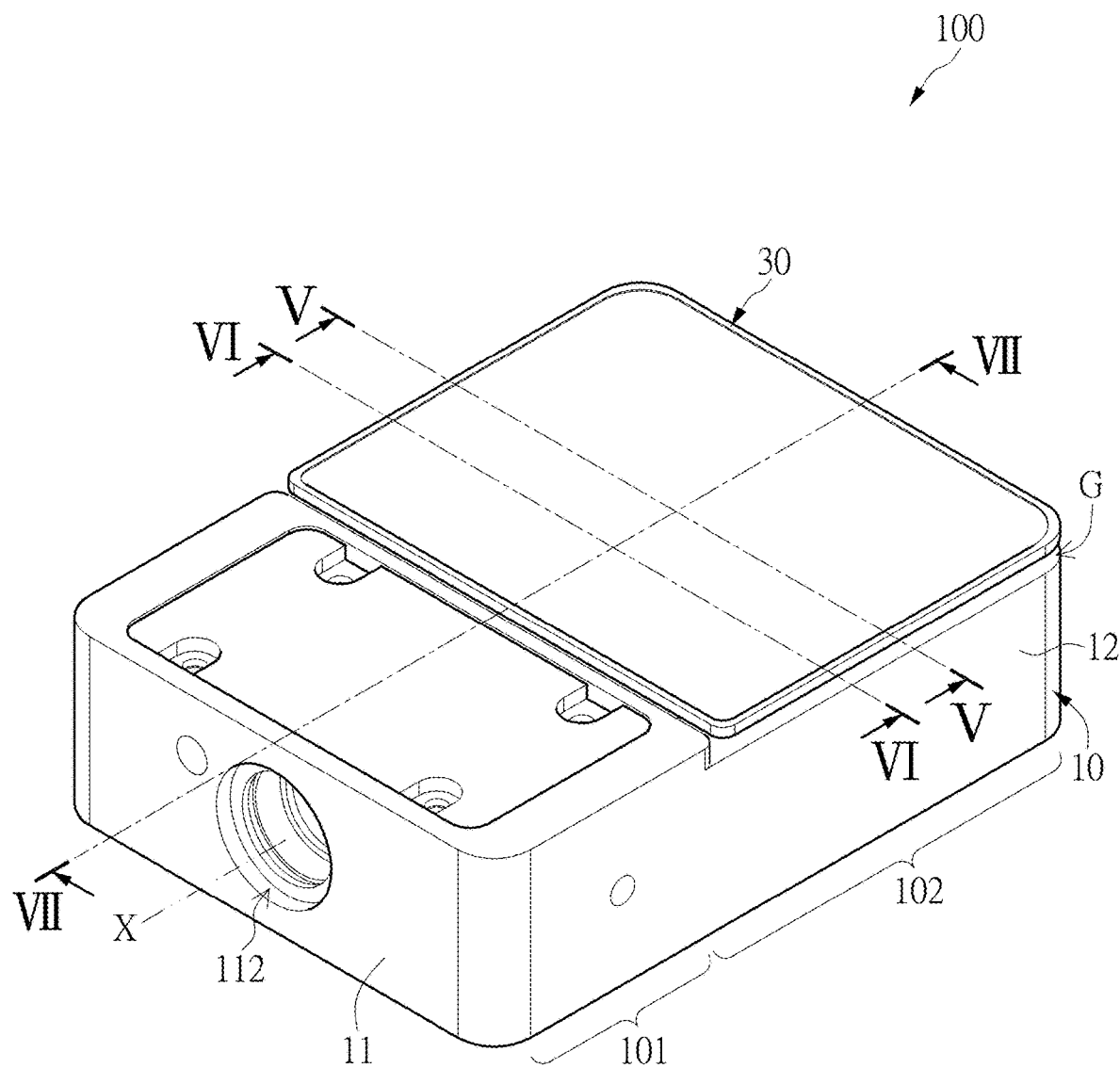
FIG. 1 is a schematic perspective assembly view of a bicycle pedal according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 5, one embodiment of the present disclosure provides a bicycle pedal 100. The bicycle pedal 100 includes a pedal body 10, a force-bearing detector 20, and a cover plate 30. The force-bearing detector 20 is disposed in the pedal body 10. The cover plate 30 partially covers one side of the pedal body 10, and a foot of a rider exerts force to step on the cover plate 30. The force-bearing detector 20 is in contact with a bottom of the cover plate 30.

Figure 2:
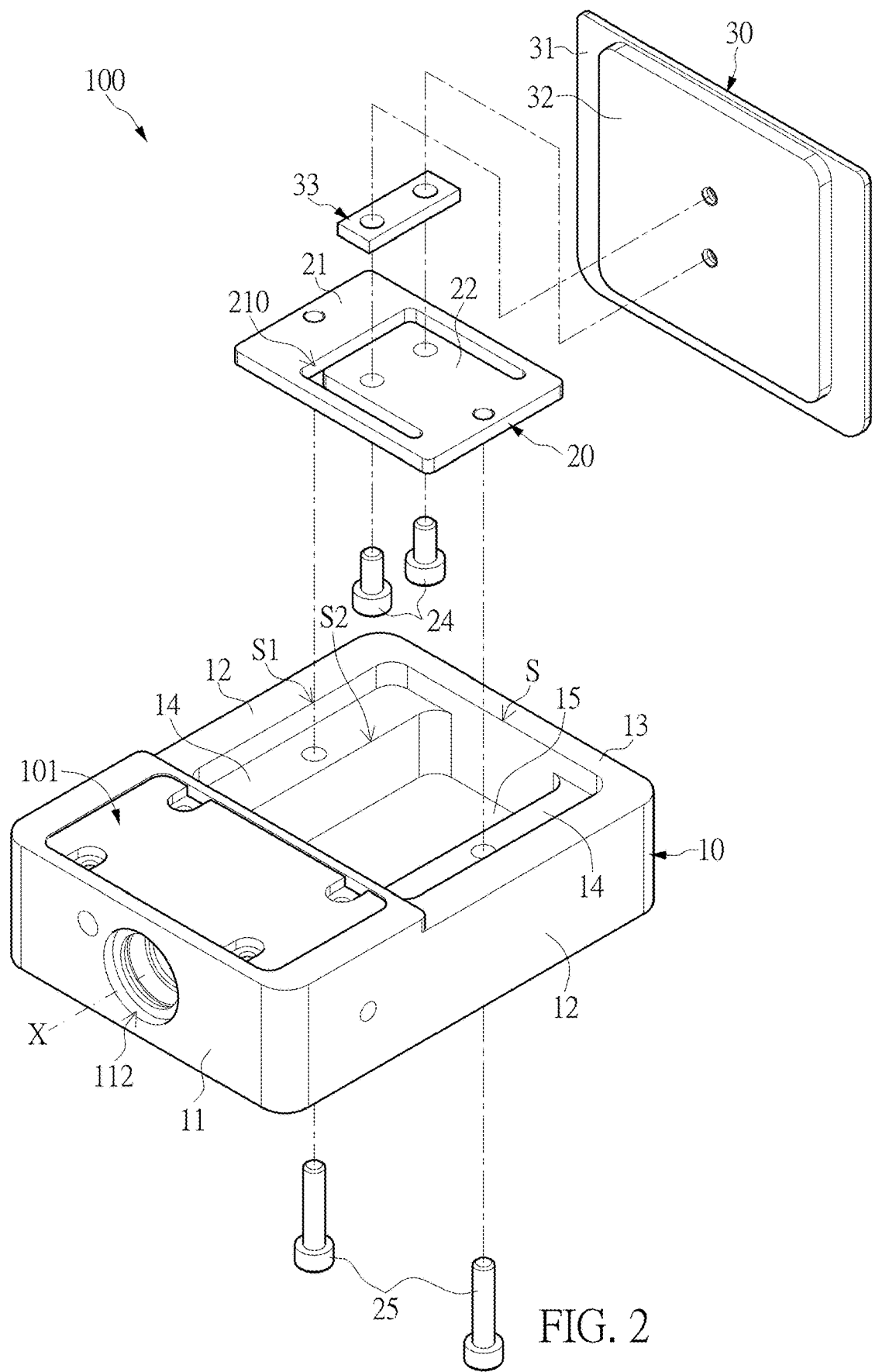
FIG. 2 is a schematic perspective exploded view of the bicycle pedal according to the first embodiment of the present disclosure.

As shown in FIG. 2, the pedal body 10 includes an adapter part 101 and a pedal part 102. The adapter part 101 is adjacent to the pedal part 102. More specifically, the pedal body 10 includes an inner wall 11, an outer wall 13, and two side walls 12. The pedal body 10 has an accommodation space S that is recessed inside the pedal part 102. Specifically, the accommodation space S is surrounded by the adapter part 101, the outer wall 13, and the two side walls 12. The accommodation space S is defined in the pedal part 102 but does not penetrate the pedal body 10. An axis hole 112 is formed in the adapter part 101 along a central axis X and can accommodate a rotating shaft (omitted in the figures) to transmit a signal of the force-bearing detector 20.

The cover plate 30 is movably disposed above the accommodation space S. The cover plate 30 includes an outer plate 31 and a protruding platform 32. The protruding platform 32 is located on the bottom surface of the outer plate 31. In this embodiment, the protruding platform 32 is smaller than the top opening of the accommodation space S, and the protruding platform 32 can move up and down in the accommodation space S.

In this embodiment, the cover plate 30 capable of force-detecting can be provided only on one side of the pedal body 10. A bottom plate 15 of the pedal part 102 of the pedal body 10 can have a counterweight function for maintaining the cover plate 30 of the pedal body 10 upward for the foot of the rider to step on the cover plate 30. However, the present disclosure is not limited thereto, and a cover plate and a force-bearing detector may be provided on each of the two sides of the pedal body 10.

Figure 3:
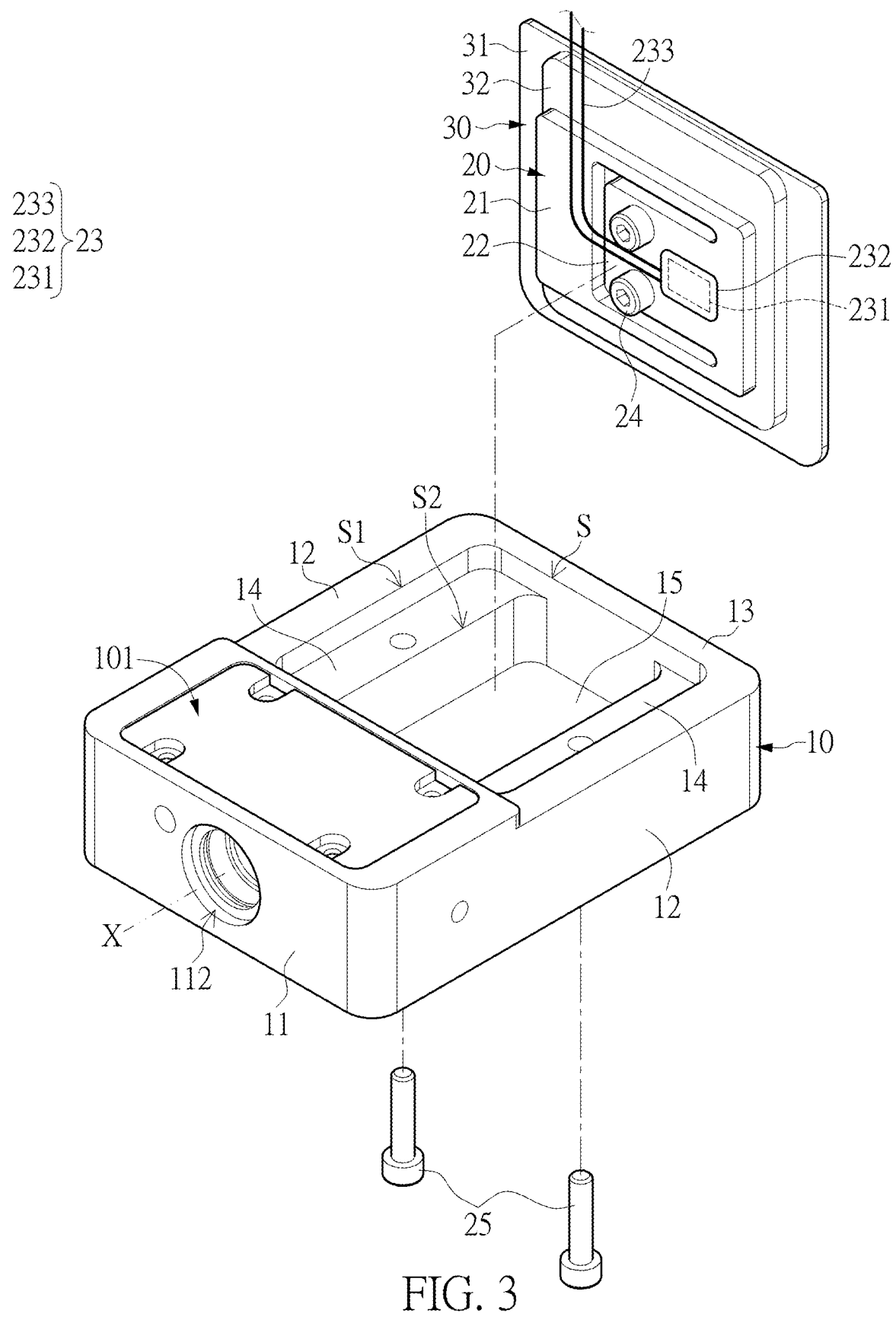
FIG. 3 is a schematic partially exploded view of the bicycle pedal according to the first embodiment of the present disclosure.

As shown in FIG. 2 and FIG. 3, the force-bearing detector 20 includes a bridging frame 21, a force-bearing beam arm 22, and a force sensor 23. A periphery of the bridging frame 21 is fixed in the accommodation space S, and one end of the force-bearing beam arm 22 is connected to the bridging frame 21. The bridging frame 21 and the force-bearing beam arm 22 are an integral metal plate such as a stainless steel plate. Referring to FIG. 3, the force sensor 23 is disposed on a bottom surface of the force-bearing beam arm 22. The bottom of the cover plate 30 is fixedly connected to a top surface of the force-bearing beam arm 22. In this embodiment, a U-shaped groove 210 is formed in the bridging frame 21, and the U-shaped groove 210 surrounds the force-bearing beam arm 22. The force-bearing beam arm 22 forms a cantilever. In addition, a longitudinal direction of the force-bearing beam arm 22 is perpendicular to the direction of an axis of rotation of the bicycle pedal 100. In other words, the longitudinal direction of the load-bearing beam arm 22 is substantially parallel to the foot sole of the rider.

However, the present disclosure is not limited thereto. For example, the bridging frame and the force-bearing beam arm may also be E-shaped. Specifically, the bridging frame is U-shaped, and the force-bearing beam arm is connected to a middle portion of the bridging frame. Alternatively, the bridging frame and the force-bearing beam arm can be T-shaped. That is, the bridging frame is substantially I-shaped, and the force-bearing beam arm is connected to the middle portion of the bridging frame.

Specifically, a manner of fixing the bridging frame 21 in this embodiment is as follows. The pedal body 10 includes two mounting pads 14 located in the accommodation space S. In this embodiment, the two mounting pads 14 respectively protrude inward from inner surfaces of the two outer walls 13 along a direction parallel to the axis of rotation of the bicycle pedal. Two sides of the bridging frame 21 are respectively fixed to the two mounting pads 14, and the force-bearing beam arm 22 is flexibly deformable and located between the two mounting pads 14.

Figure 5:
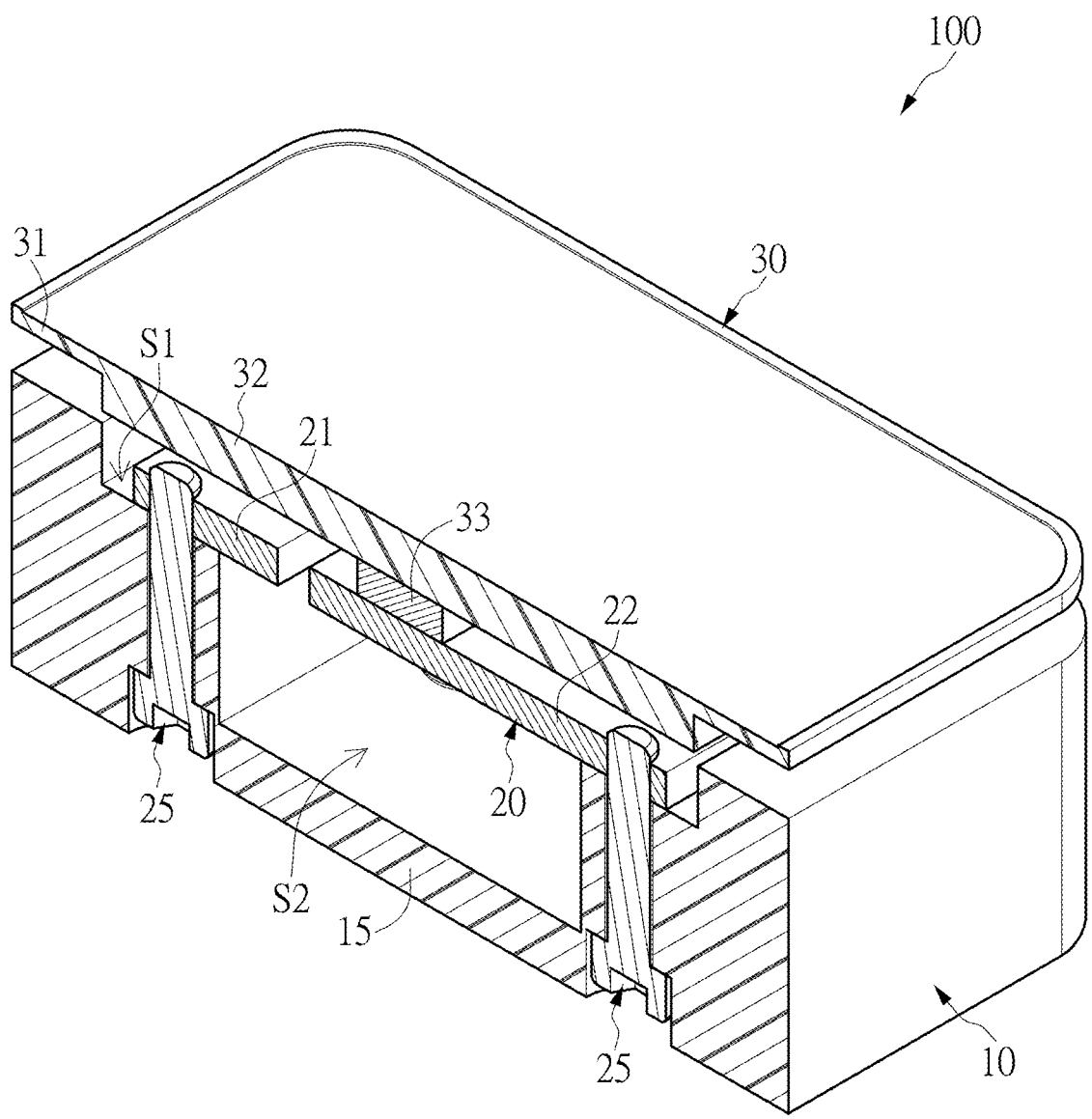
FIG. 5 is a schematic cross-sectional view taken along line V-V of FIG. 1.

In this embodiment, as a manner of fixing the bridging frame 21, the bicycle pedal 100 further includes two second screw rods 25. The two second screw rods 25 fixedly connect the two sides of the bridging frame 21 to the two mounting pads 14, respectively. The two second screw rods 25 respectively penetrate upward from the pedal body 10 through the two mounting pads 14, and are threadedly screwed to the two sides of the bridging frame 21. After assembly, the bicycle pedal 100 is as shown in FIG. 5, which is a perspective cross-sectional view of the bicycle pedal 100. However, the present disclosure is not limited thereto. The function of the two second screw rods 25 is to fix two sides of the bridging frame 21 to the pedal body 10 and provide a function similar to that of a fulcrum. The second screw rods 25 can also be used as a fixing member in other ways to sideways fix the bridging frame 21 to the pedal body 10.

The two mounting pads 14 in this embodiment divide the accommodation space S into two parts. The accommodation space S can be defined into an upper half space S1 and a lower half space S2. The lower half space S2 is located between the two mounting pads 14, and the upper half space S1 is located above the two mounting pads 14. A width of the upper half space S1 (along the direction perpendicular to the axis of rotation) is greater than a width of the lower half space S2 (along the direction perpendicular to the axis of rotation).

The bicycle pedal 100 of this embodiment further includes an adapter plate 33. The adapter plate 33 is connected between the cover plate 30 and the force-bearing detector 20. A bottom surface of the cover plate 30 has a protruding platform 32. The adapter plate 33 is placed between the top surface of the force-bearing beam arm 22 and a bottom surface of the protruding platform 32, and the protruding platform 32 is movably located within a range of the accommodation space S.

Figure 6:
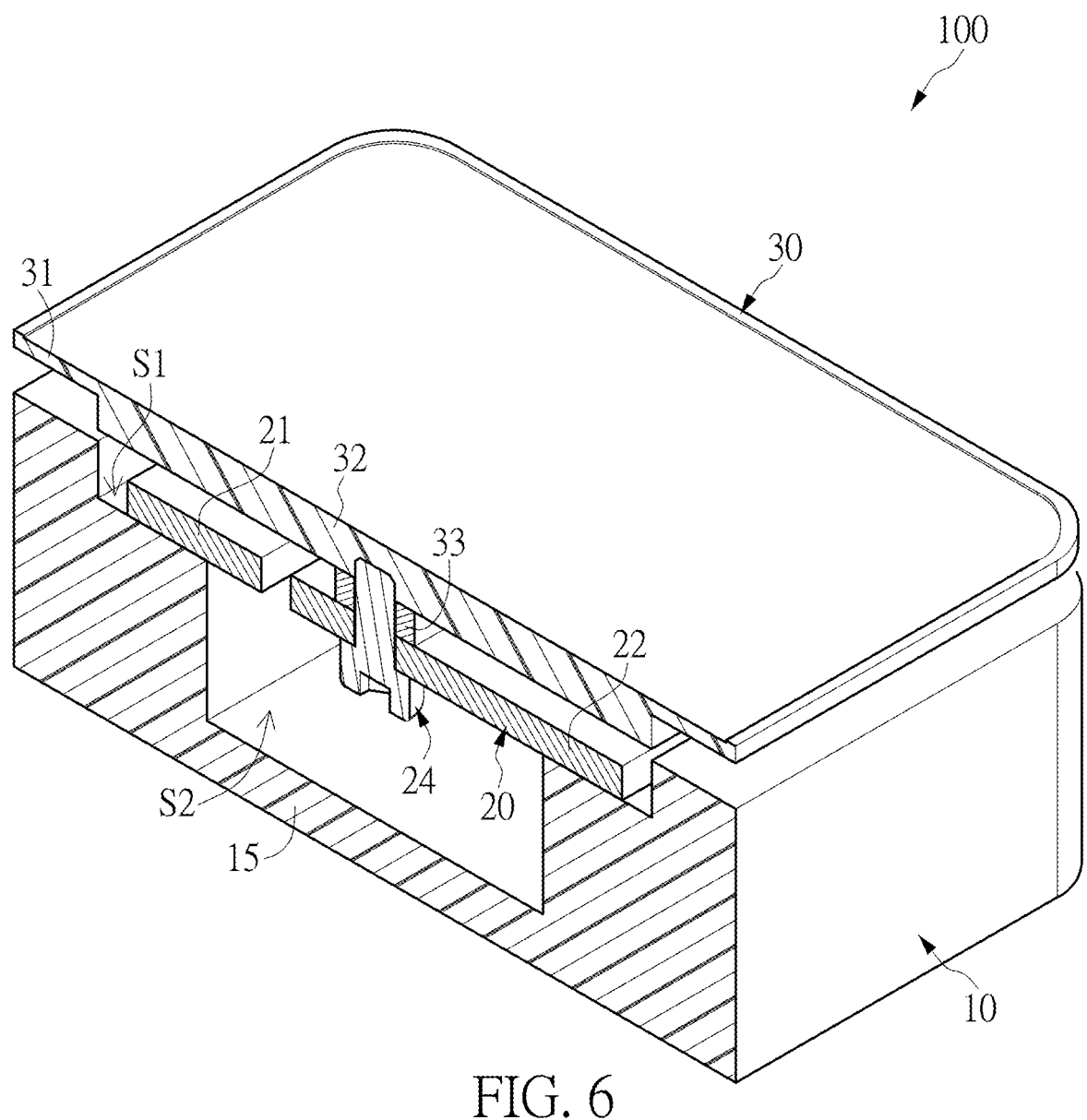
FIG. 6 is a schematic cross-sectional view taken along line VI-VI of FIG. 1.
Figure 7:
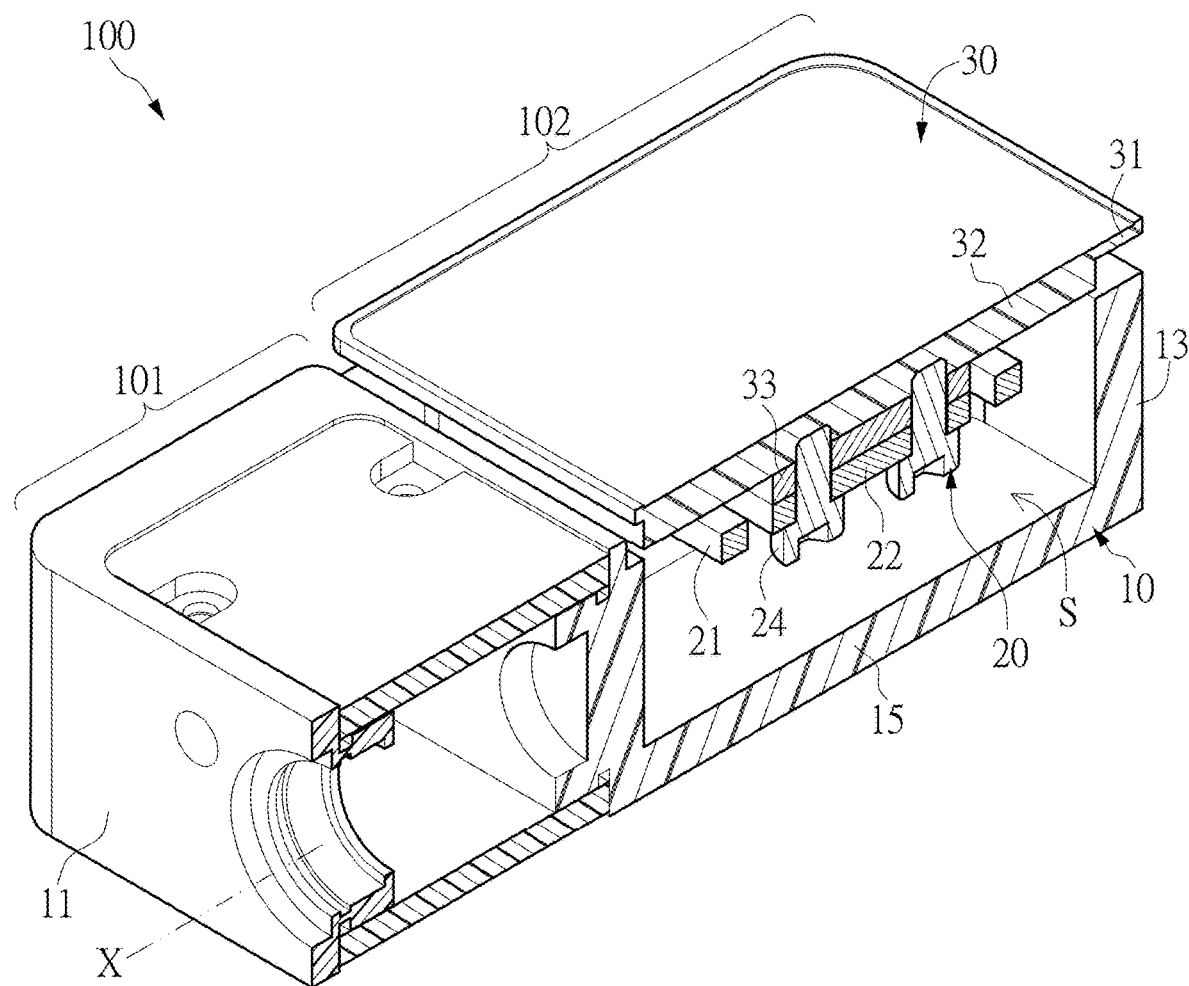
FIG. 7 is a schematic cross-sectional view taken along line VII-VII of FIG. 1.
Figure 8:
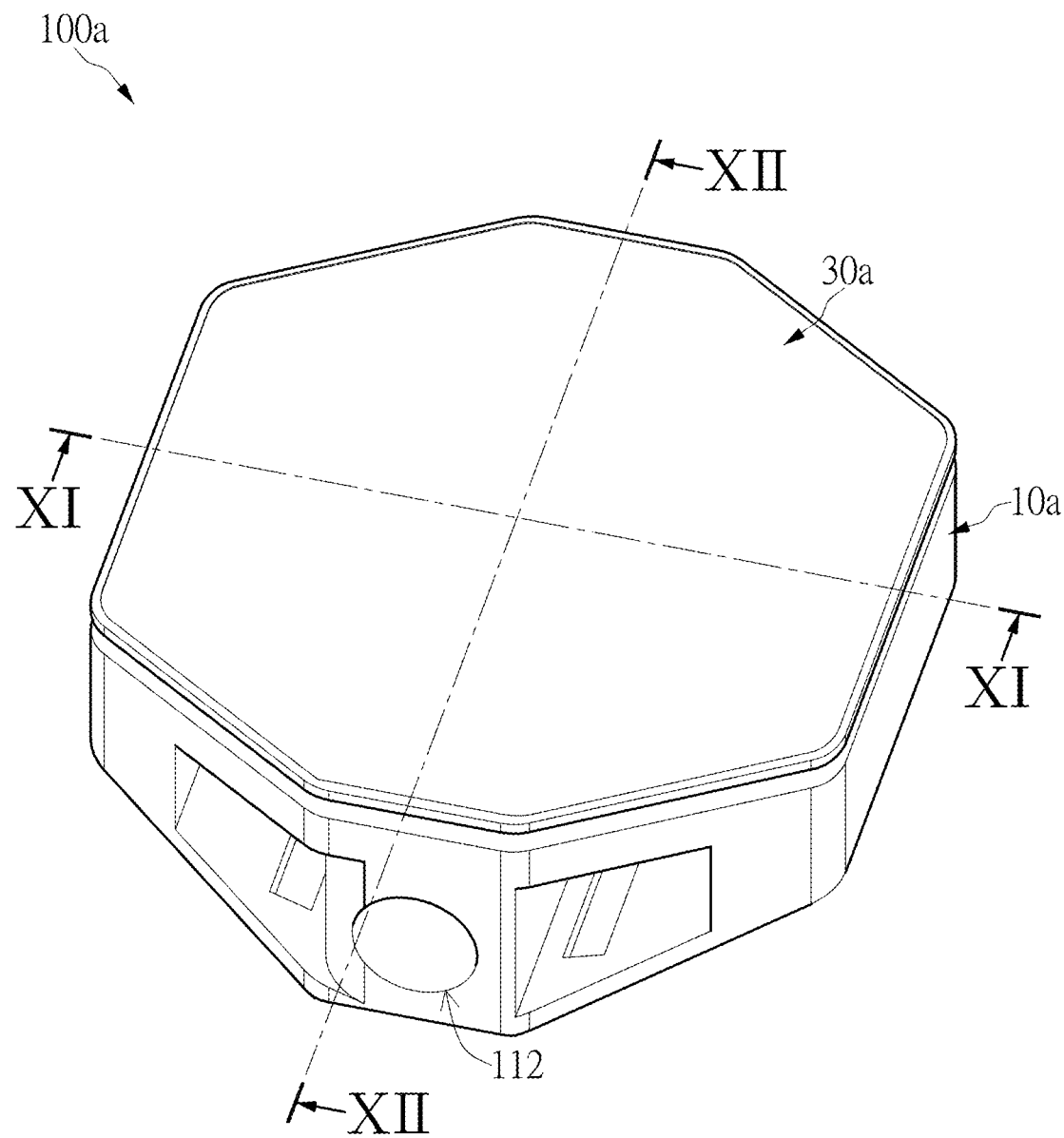
FIG. 8 is a schematic perspective assembly view of the bicycle pedal according to a second embodiment of the present disclosure.

In order to fix the force-bearing detector 20 to the cover plate 30, this embodiment further includes two first screw rods 24. The two first screw rods 24 penetrate from the bottom surface of the force-bearing beam arm 22 through the force-bearing beam arm 22 and the adapter plate 33, and are threadedly screwed to the protruding platform 32 of the cover plate 30. The two first screw rods 24 of this embodiment do not protrude from a top surface of the cover plate 30. After assembly, as shown in FIG. 6 and FIG. 7, another perspective cross-sectional view of the bicycle pedal 100 is shown.

Referring to FIG. 3, the force sensor 23 is, for example, a strain gauge sensor. The force sensor 23 includes a strain gauge 231, an outer cover layer 232, and a measuring wire 233. The strain gauge 231 is attached to the bottom surface of the force-bearing beam arm 22. The outer cover layer 232 covers the strain gauge 231. The outer cover layer 232 is, for example, a waterproof resin. The measuring wire 233 is connected to the strain gauge 231 and passes through the pedal body 10 to be connected to a control unit of the bicycle (omitted in the figure).

Figure 4:
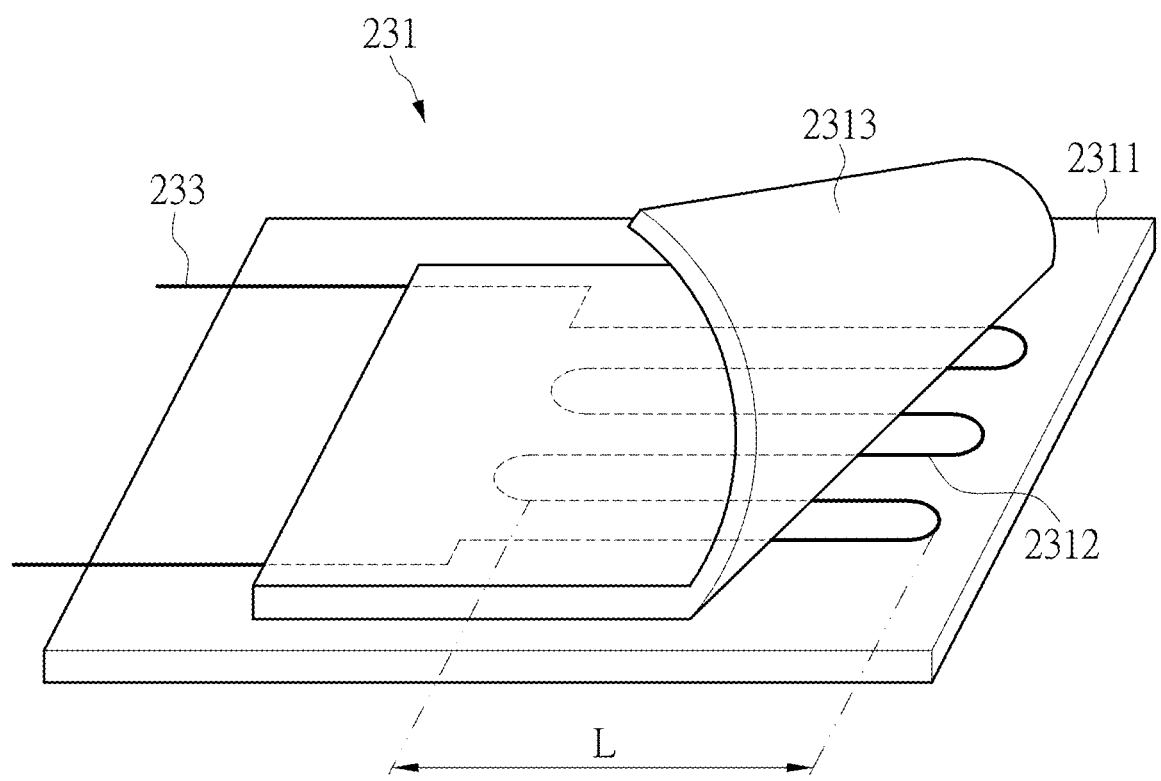
FIG. 4 is a schematic perspective view of a strain gauge according to the present disclosure.

As shown in FIG. 4, a manner of sensing force in this embodiment is introduced as follows. The strain gauge 231 includes a base 2311, a sensitive grid 2312, and a covering layer 2313. The sensitive grid 2312 is made of metal wires having a width of from 0.01 mm to 0.05 mm, and the metal wires are wound to have a grid shape and are adhered to the base 2311 that is insulated. The base 2311 of the strain gauge 231 is firmly located on a force measuring point on the bottom surface of the force-bearing beam arm 22, and the covering layer 2313 is attached to the sensitive grid 2312 to provide protection. Two ends of the sensitive grid 2312 are connected to the measuring wire 233. The force-bearing beam arm 22 undergoes strain after receiving force, and an electrical resistance of the sensitive grid 2312 is also changed along with the deformation of the force-bearing beam arm 22.

The working principle of the strain gauge 231 is based on the strain effect. According to materials, existing strain gauges can be divided into wire strain gauges, foil strain gauges, and metal film strain gauges. When the sensitive grid 2312 is mechanically deformed under the exertion of an external force, a length L of the sensitive grid 2312 is changed, and the electrical resistance of the sensitive grid 2312 is also changed accordingly; such phenomenon is known as a "strain effect."

The base 2311 of the strain gauge 231 is attached to the measured force-bearing beam arm 22. The external force of stepping is exerted on the stress-bearing beam arm 22 such that strain occurs in the stress-bearing beam arm 22, causing the electrical resistance value of the strain gauge 231 to change. By measuring the change in the electrical resistance value of the strain gauge, a value of the external force can be known. The relationship between the electrical resistance value of the strain gauge 231 and the electrical resistance change value is as follows:

$$\Delta R/R = GF * \varepsilon. \qquad \text{Formula (1)}$$

Here, R is the electrical resistance value of the strain gauge; ΔR is the electrical resistance change value when strain occurs in the stress-bearing beam arm 22.

GF is the gauge factor, which represents the sensitivity of the strain gauge; the gauge coefficient GF of the copper-nickel alloy and nickel-chromium alloy of common strain gauges is substantially 2. ε is stress, which can also be called a length strain value.

The above relational expression is converted as follows:

$$\varepsilon = (\Delta R/R)/GF; \qquad \text{Formula (2)}$$

$$\text{furthermore, } \varepsilon = \Delta L/L. \qquad \text{Formula (3)}$$

Here, L is a length of a material before force-bearing, and ΔL is the material length change caused by force-bearing.

The force exerted on the pedal is applied to the force sensor 23 through the cover plate 30, and the force sensor 23 elastically deforms, causing the impedance of the force sensor 23 to change. The measuring wire 233 amplifies an analog signal of a tiny voltage or a current through an amplifier circuit, and then outputs the analog signal to an analog-to-digital converter (A/D converter) to convert the analog signal into a digital signal for processing by a processor.

Second Embodiment

Referring to FIG. 8 to FIG. 12, one embodiment of the present disclosure provides a bicycle pedal 100a. The difference from the above-mentioned embodiment is mainly in shapes and configurations of internal spaces of the bicycle pedal 100a. The shape of the bicycle pedal 100a in this embodiment is slightly hexagonal, and the bicycle pedal 100a in this embodiment includes a pedal body 10a, a force-bearing detector 20a, and a cover plate 30a.

Figure 9:
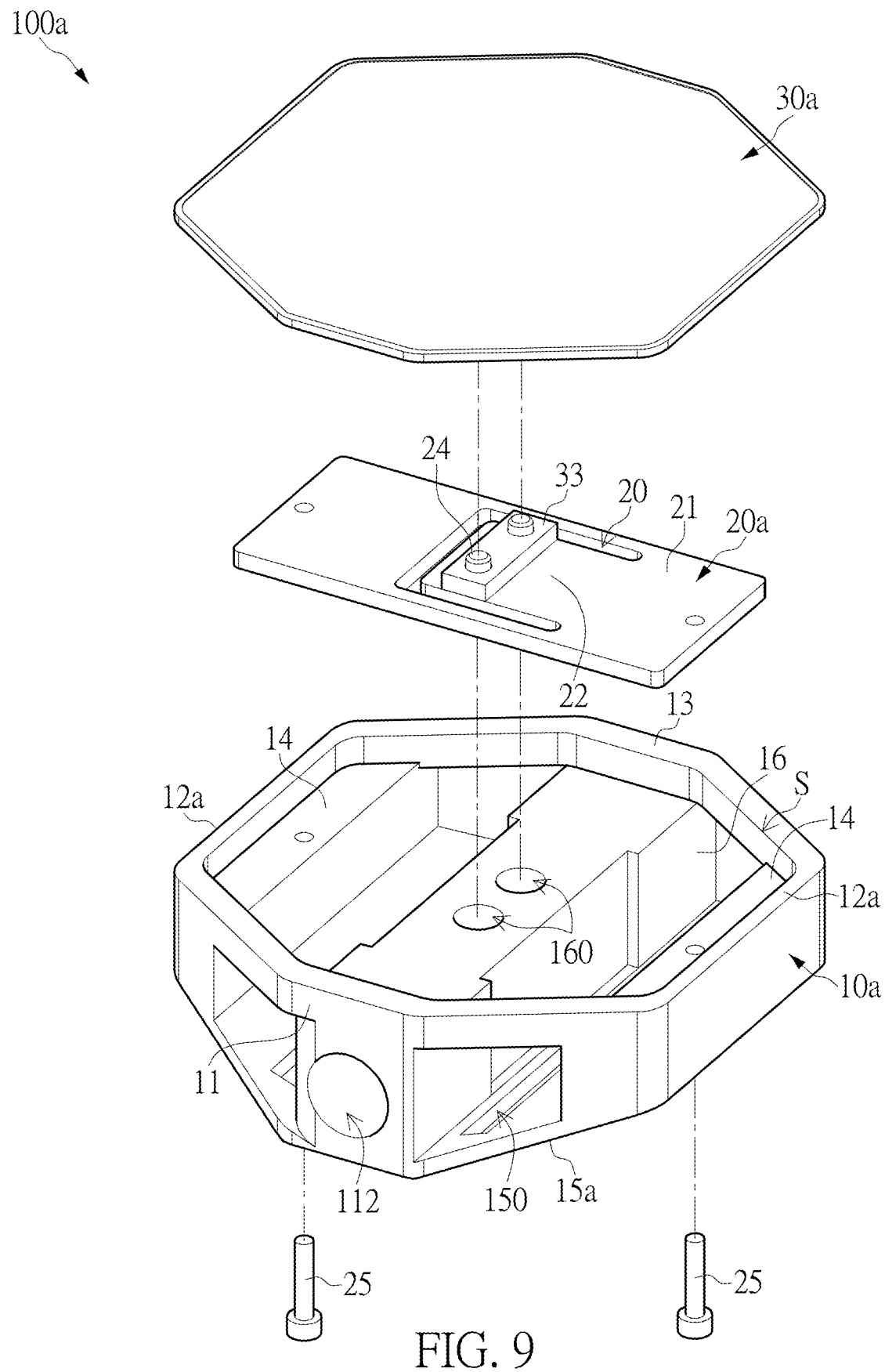
FIG. 9 is a schematic perspective exploded view of the bicycle pedal according to the second embodiment of the present disclosure.
Figure 10:
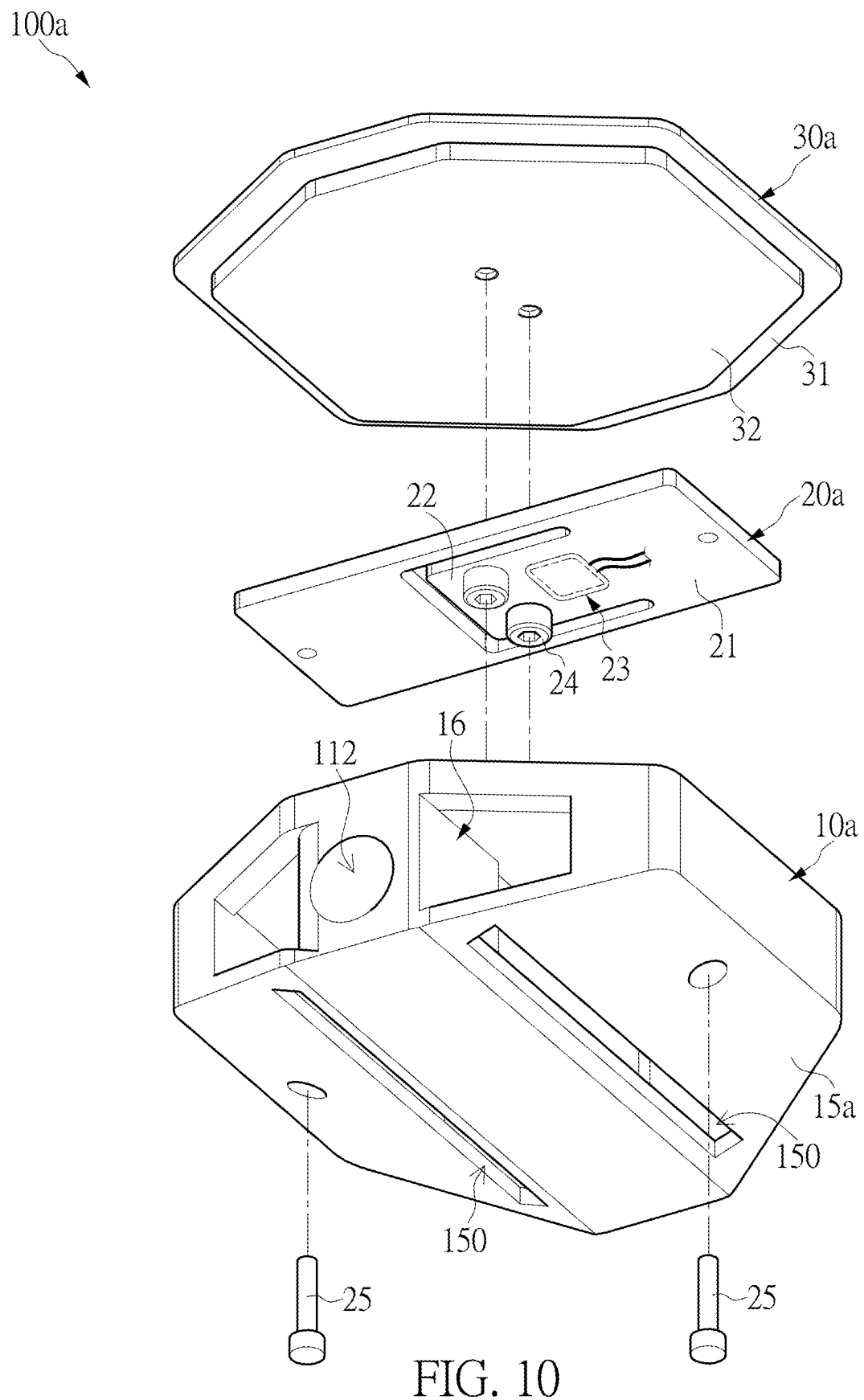
FIG. 10 another schematic perspective exploded view of the bicycle pedal according to the second embodiment of the present disclosure.
Figure 11:
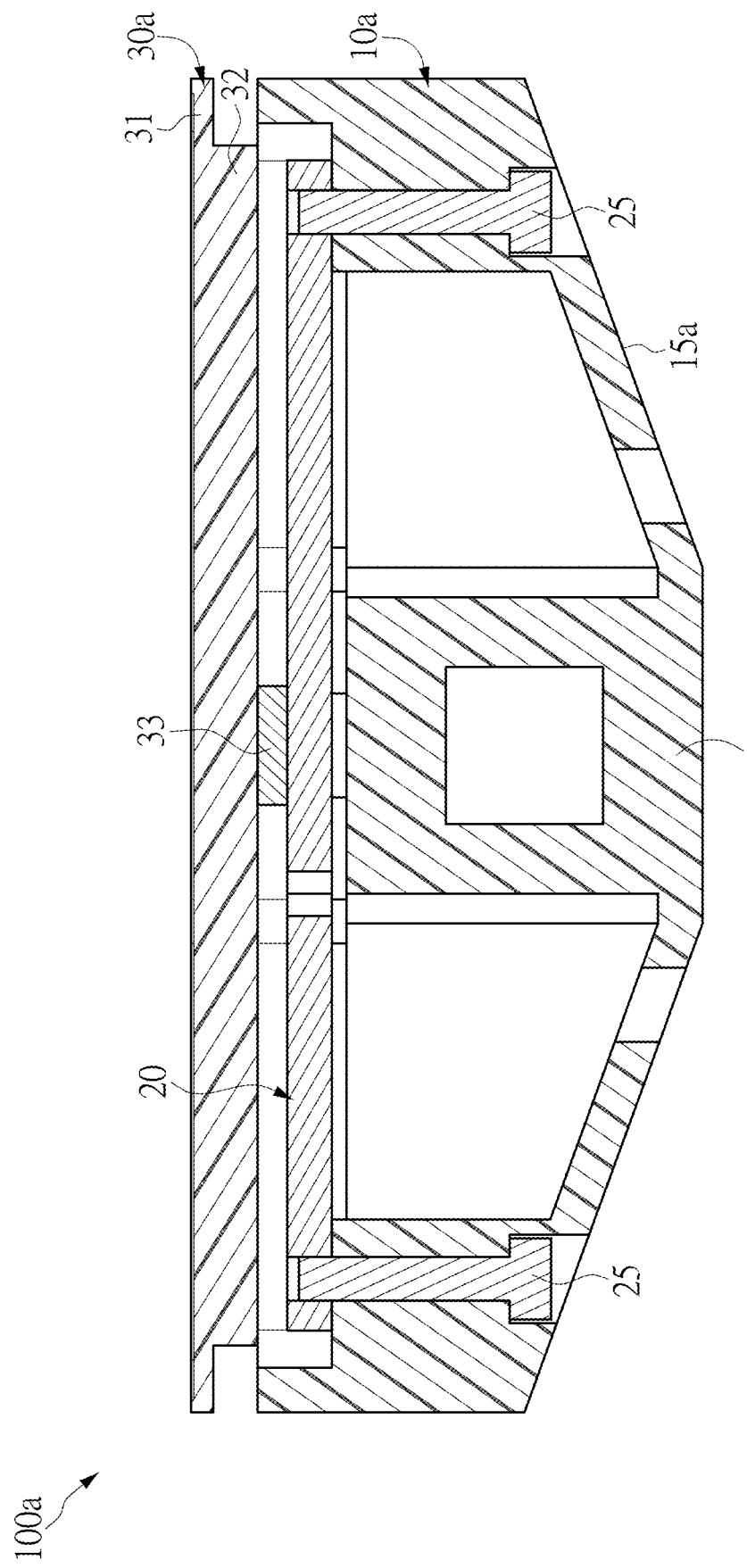
FIG. 11 is a cross-sectional view taken along line XI-XI of FIG. 8.
Figure 12:
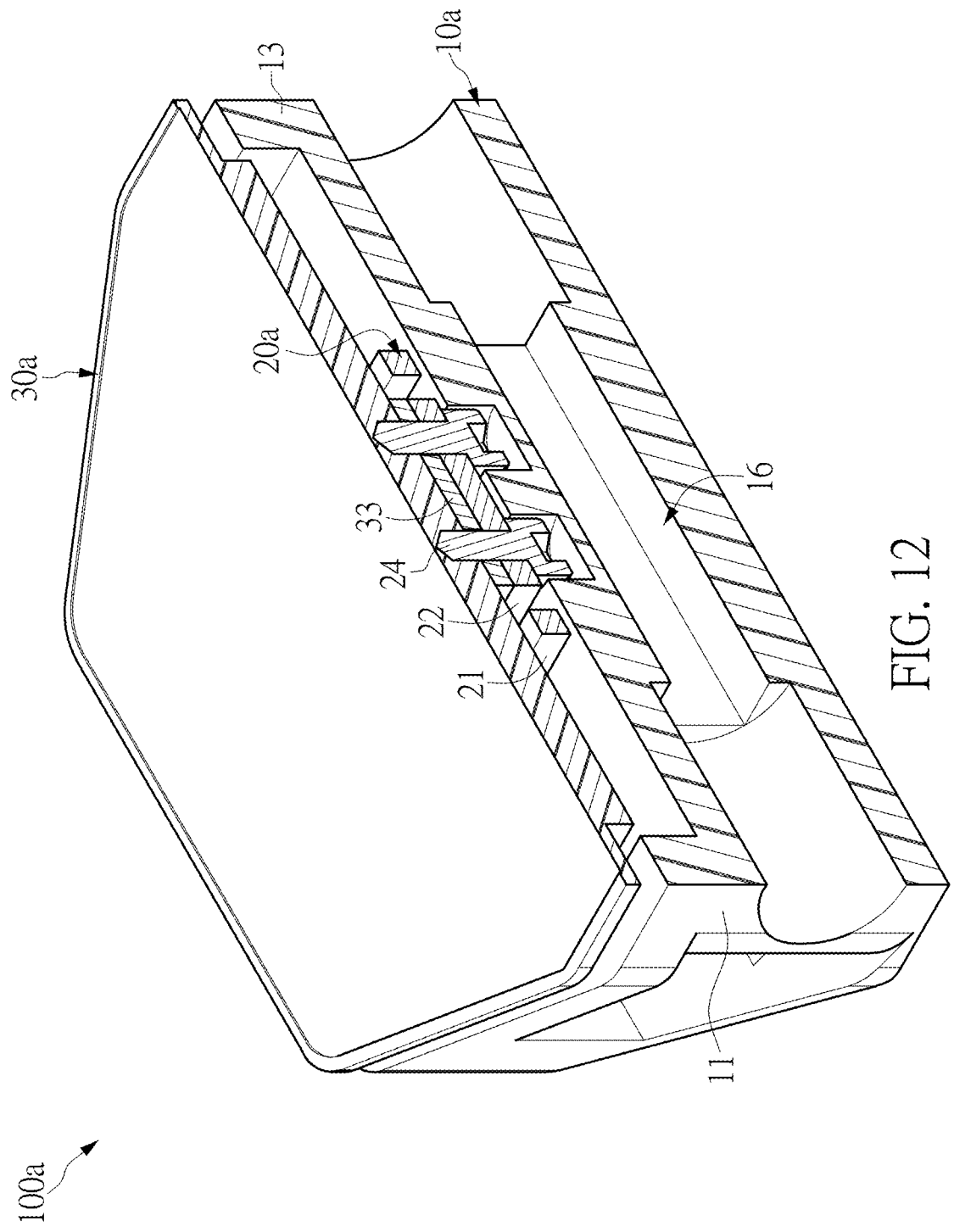
FIG. 12 is a cross-sectional view taken along line XII-XII of FIG. 8.

As shown in FIG. 9 and FIG. 10, the pedal body 10a is substantially hexagonal, and side walls 12a on two sides are slightly tapered outward. The pedal body 10a includes two mounting pads 14. The two mounting pads 14a are located in the accommodation space S and adjacent to the side walls 12a. The pedal body 10a has an axis accommodating part 16 in the middle, and the axis accommodating part 16 is connected to the outer wall 13 from the inner wall 11. The axis accommodating part 16 can accommodate a transmission mechanism (omitted in the figure). The above-mentioned transmission mechanism refers to a power and signal transmission mechanism that can continuously and immediately transmit power and signal to a control unit of the bicycle in a pedal rotation state. Certain through holes (omitted in the figures) can be formed on the axis accommodating part 16, such that circuits of the force-bearing detector 20a can pass into the inside of the axis accommodating part 16. A bottom plate 15a is opposite to the cover plate 30a, and the bottom plate 15a substantially extends upward from two sides of the axis accommodating part 16. The bottom plate 15a has long slits 150 that allow liquid to drain downward.

The force-bearing detector 20a of this embodiment is similar to that of the previous embodiment, and the bridging frame 21 is substantially lengthened to bridge the two mounting pads 14.

Two receiving holes 160 are formed at a top portion of the axis accommodating part 16 to provide a movement space for the two first screw rods 24 of the force-bearing detector 20a, thereby allowing the force-bearing beam arm 22 to have a space for downward deformation. However, the present disclosure is not limited thereto. A height of nuts of the first screw rods 24 can be reduced, or a size of the axis accommodating part 16 can be reduced, so as to omit the two receiving holes 160.

A feature of the cover plate 30a of this embodiment is that, the cover plate 30a covers the entire top surface of the pedal body 10a. The cover plate 30a is substantially hexagonal in shape and includes the outer plate 31 and the protruding platform 32.

The axis accommodating part 16 of this embodiment runs across the entire pedal 100a, that is, the axis accommodating part 16 extends from the inner wall 11 to the outer wall 13, so as to accommodate a longer transmission shaft and to withstand a greater torque. In addition, a shape of the pedal 100a has substantially the same cross-section along the axis of the axis accommodating part 16, such that the shape is suitable for being manufactured by using aluminum extrusion technique in conjunction with certain subsequent processing, thereby saving more time in manufacturing.

Beneficial Effects of the Embodiments

In conclusion, in the bicycle pedal provided by the present disclosure, by virtue of "the bicycle pedal including a pedal body, a force-bearing detector, and a cover plate; the force-bearing detector including a bridging frame, a force-bearing beam arm, and a force sensor; one end of the force-bearing beam arm being connected to the bridging frame; the force sensor being disposed on a bottom surface of the force-bearing beam arm; the cover plate being movably disposed in the accommodation space; and a bottom of the cover plate being fixedly connected to a top surface of the force-bearing beam arm," the bicycle pedal is able to more accurately detect an actual peddling and force exertion of the rider, transmit information to a control module, and provide suitable auxiliary power through a motor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A bicycle pedal, comprising:
   a pedal body having an accommodation space that is recessed;
   a force-bearing detector including a bridging frame, a force-bearing beam arm, and a force sensor, wherein a periphery of the bridging frame is fixed in the accommodation space, one end of the force-bearing beam arm is connected to the bridging frame, another end of the force-bearing beam arm is a free end to form a cantilever, and the force sensor is disposed on a bottom surface of the force-bearing beam arm;
   a cover plate movably disposed in the accommodation space, wherein the cover plate is fixedly connected to a top surface of the force-bearing beam arm to concentrate force on the free end of the force-bearing beam arm; and
   an adapter plate connected between the cover plate and the force-bearing detector, and a bottom surface of the cover plate has a protruding platform; wherein the adapter plate is placed between the top surface of the force-bearing beam arm and a bottom surface of the protruding platform, and the protruding platform is movably located within a range of the accommodation space.

2. The bicycle pedal according to claim 1, wherein the pedal body includes an adapter part and a pedal part, the adapter part is adjacent to the pedal part, and the accommodation space is defined in the pedal part; and wherein an axis hole is formed in the adapter part, and the axis hole is connected to the accommodation space.

3. The bicycle pedal according to claim 1, wherein the pedal body includes two mounting pads, the two mounting pads are located in the accommodation space, and two sides of the bridging frame are respectively fixed to the two mounting pads; wherein the force-bearing beam arm is flexibly deformable and located between the two mounting pads.

4. The bicycle pedal according to claim 3, wherein the accommodation space includes an upper half space and a lower half space, the lower half space is located between the two mounting pads, and the upper half space is located above the two mounting pads.

5. The bicycle pedal according to claim 1, further comprising two first screw rods, wherein the two first screw rods penetrate from the bottom surface of the force-bearing beam arm through the force-bearing beam arm and the adapter plate, and are threadedly screwed to the protruding platform of the cover plate.

6. The bicycle pedal according to claim 5, further comprising two second screw rods, wherein the two second screw rods fixedly connect the two sides of the bridging frame to the two mounting pads of the pedal body, respectively.

7. The bicycle pedal according to claim 1, wherein the force sensor includes a strain gauge, an outer cover layer, and a measuring wire, the strain gauge is attached to the bottom surface of the force-bearing beam arm, the outer cover layer covers the strain gauge, and the measuring wire is connected to the strain gauge and passes through the pedal body.

8. The bicycle pedal according to claim 1, wherein a U-shaped groove is formed in the bridging frame, and the U-shaped groove surrounds the force-bearing beam arm, and wherein a longitudinal direction of the force-bearing beam arm is perpendicular to a direction of an axis of rotation of the bicycle pedal.

9. The bicycle pedal according to claim 1, wherein the pedal body includes an inner wall and an outer wall, an interior of the pedal body includes an axis accommodating part, and the axis accommodating part extends from the inner wall to the outer wall.

10. A bicycle pedal, comprising:
- a pedal body having an accommodation space that is recessed;
- a force-bearing detector including a bridging frame, a force-bearing beam arm, and a force sensor, wherein a periphery of the bridging frame is fixed in the accommodation space, one end of the force-bearing beam arm is connected to the bridging frame, another end of the force-bearing beam arm is a free end to form a cantilever, and the force sensor is disposed on a bottom surface of the force-bearing beam arm; and
- a cover plate movably disposed in the accommodation space, wherein a bottom of the cover plate is fixedly connected to a top surface of the force-bearing beam arm to concentrate force on the free end of the force-bearing beam arm;
- wherein the force sensor includes a strain gauge, an outer cover layer, and a measuring wire, the strain gauge is attached to the bottom surface of the force-bearing beam arm, the outer cover layer covers the strain gauge, and the measuring wire is connected to the strain gauge and passes through the pedal body.

* * * * *